United States Patent
Youst (10) Patent No.: US 11,190,634 B2
(45) Date of Patent: *Nov. 30, 2021

(54) MOBILE PHONE HAVING EMERGENCY NOTIFICATION MODE

(71) Applicant: Lawrence R. Youst, Dallas, TX (US)

(72) Inventor: Lawrence R. Youst, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/780,900

(22) Filed: Feb. 3, 2020

(65) Prior Publication Data

US 2020/0314232 A1   Oct. 1, 2020

Related U.S. Application Data

(63) Continuation of application No. 15/877,389, filed on Jan. 23, 2018, now Pat. No. 10,554,806, which is a continuation of application No. 15/361,711, filed on Nov. 28, 2016, now Pat. No. 9,876,895, which is a continuation of application No. 15/048,282, filed on Feb. 19, 2016, now Pat. No. 9,509,831, which is a continuation of application No. 14/589,984, filed on Jan. 5, 2015, now Pat. No. 9,300,786, which is a
(Continued)

(51) Int. Cl.
| | | |
|---|---|---|
| *H04W 4/14* | (2009.01) |
| *H04W 68/00* | (2009.01) |
| *H04M 19/04* | (2006.01) |
| *H04M 1/72448* | (2021.01) |
| *H04W 4/18* | (2009.01) |
| *H04L 29/08* | (2006.01) |
| *H04M 1/72451* | (2021.01) |

(52) U.S. Cl.
CPC ...... *H04M 1/72448* (2021.01); *H04L 67/306* (2013.01); *H04M 19/04* (2013.01); *H04M 19/042* (2013.01); *H04W 4/14* (2013.01); *H04W 4/18* (2013.01); *H04W 68/00* (2013.01); *H04M 1/72451* (2021.01)

(58) Field of Classification Search
None
See application file for complete search history.

(56) References Cited

U.S. PATENT DOCUMENTS

| | | |
|---|---|---|
| 4,278,844 A | 7/1981 | Jones |
| 4,802,202 A | 1/1989 | Takahashi et al. |

(Continued)

*Primary Examiner* — Ajit Patel
(74) *Attorney, Agent, or Firm* — Lawrence Youst PLLC (57) ABSTRACT

A mobile phone configured to operate in a normal notification mode and an emergency notification mode. The mobile phone includes a memory adapted to maintain profiles relating to user contacts, an output device operable to emit audible notifications responsive to incoming communications, at least one input device operable to receive a user selection of a silent notification mode of the device and a user selection of a silent mode disabled setting associated with the profiles and a processor coupled to the memory, the output device and the at least one input device. When the device is in the silent notification mode, audible notifications are not emitted from the output device responsive to incoming communications from the user contacts having profiles without the silent mode disabled and audible notifications are emitted from the output device responsive to incoming communications from the user contacts having profiles with the silent mode disabled.

20 Claims, 3 Drawing Sheets

Related U.S. Application Data continuation of application No. 13/892,877, filed on May 13, 2013, now Pat. No. 8,929,875.

(56) References Cited

U.S. PATENT DOCUMENTS

| | | | |
|---|---|---|---|
| 5,467,388 A | 11/1995 | Redd et al. |
| 5,553,125 A | 9/1996 | Martensson |
| 5,559,860 A | 9/1996 | Mizikovsky |
| 5,604,791 A | 2/1997 | Lee |
| 5,812,648 A | 9/1998 | Wanner |
| 5,845,219 A | 12/1998 | Henriksson |
| 5,872,840 A | 2/1999 | Wu |
| 6,611,682 B1 | 8/2003 | Pröjtz |
| 6,701,160 B1 | 3/2004 | Pinder et al. |
| 6,741,688 B1 | 5/2004 | Yau |
| 6,968,216 B1 | 11/2005 | Chen et al. |
| 7,221,939 B2 | 5/2007 | Ylitalo et al. |
| 7,248,900 B2 | 7/2007 | Deeds |
| 7,458,080 B2 | 11/2008 | Parker et al. |
| 7,469,155 B2 | 12/2008 | Chu |
| 7,606,561 B2 | 10/2009 | Mathew et al. |
| 7,671,756 B2 | 3/2010 | Herz et al. |
| 7,734,033 B2 | 6/2010 | Aupperle et al. |
| 7,840,238 B2 | 11/2010 | Silver |
| 8,254,904 B1 | 8/2012 | Radoshinsky et al. |
| 8,289,158 B2 | 10/2012 | Bocking et al. |
| 8,346,881 B1 | 1/2013 | Cohen |
| 8,355,491 B1 | 1/2013 | Butt |
| 8,355,705 B2 | 1/2013 | Kitaya |
| 8,478,242 B2 | 7/2013 | Mathew et al. |
| 8,576,828 B1 | 11/2013 | Massey |
| 8,577,000 B1 | 11/2013 | Brown |
| 8,610,564 B2 | 12/2013 | Bocking et al. |
| 8,676,182 B2 | 3/2014 | Bell et al. |
| 8,676,273 B1 | 3/2014 | Fujisaki |
| 8,929,875 B2 | 1/2015 | Youst |
| 8,954,038 B2 | 2/2015 | Nassimi |
| 9,172,787 B2 | 10/2015 | Kemmler et al. |
| 9,300,786 B2 | 3/2016 | Youst |
| 9,301,112 B2 | 3/2016 | Morris et al. |
| 9,348,607 B2 | 5/2016 | Chaudhri et al. |
| 9,462,438 B2 | 10/2016 | Warr |
| 9,509,831 B2 | 11/2016 | Youst |
| 9,876,895 B2 | 1/2018 | Youst |
| 10,554,806 B2 | 2/2020 | Youst |
| 2002/0142792 A1 | 10/2002 | Martinez |
| 2003/0156700 A1 | 8/2003 | Brown et al. |
| 2004/0110502 A1 | 6/2004 | Lindqvist et al. |
| 2004/0203769 A1* | 10/2004 | Sakanaba ............ H04W 64/00 455/435.1 |
| 2005/0008135 A1 | 1/2005 | Bressler |
| 2005/0075096 A1 | 4/2005 | Aljuraid |
| 2005/0107112 A1 | 5/2005 | Deeds |
| 2005/0170849 A1 | 8/2005 | McClelland |
| 2005/0175158 A1 | 8/2005 | Janssen |
| 2005/0186977 A1 | 8/2005 | Chiu et al. |
| 2005/0261034 A1 | 11/2005 | Punaganti et al. |
| 2006/0105800 A1 | 5/2006 | Lee |
| 2006/0121887 A1 | 6/2006 | Chilukoor |
| 2006/0178128 A1* | 8/2006 | Eaton ................... H04W 76/50 455/404.1 |
| 2006/0233338 A1 | 10/2006 | Venkata |
| 2006/0240877 A1 | 10/2006 | Filiba et al. |
| 2006/0248183 A1 | 11/2006 | Barton |
| 2007/0021108 A1 | 1/2007 | Bocking et al. |
| 2007/0026889 A1* | 2/2007 | Yamauchi ......... H04M 1/72418 455/552.1 |
| 2007/0036347 A1 | 2/2007 | Teicher |
| 2007/0143422 A1 | 6/2007 | Cai |
| 2007/0190991 A1 | 8/2007 | Cargille |
| 2007/0275767 A1 | 11/2007 | Steele |
| 2008/0057925 A1 | 3/2008 | Ansari |
| 2008/0207263 A1 | 8/2008 | May et al. |
| 2008/0220752 A1 | 9/2008 | Forstall et al. |
| 2009/0165145 A1 | 6/2009 | Haapsaari et al. |
| 2009/0170480 A1 | 7/2009 | Lee |
| 2009/0221262 A1* | 9/2009 | Miwa ................... G08B 29/181 455/404.1 |
| 2009/0268894 A1 | 10/2009 | Minamikawa |
| 2009/0270080 A1 | 10/2009 | Mathew et al. |
| 2009/0295562 A1 | 12/2009 | Shuster |
| 2010/0099354 A1 | 4/2010 | Johnson |
| 2010/0222084 A1 | 9/2010 | Butterfield et al. |
| 2010/0227602 A1 | 9/2010 | Zhang |
| 2011/0201301 A1 | 8/2011 | Okada et al. |
| 2011/0300846 A1 | 12/2011 | Chiu et al. |
| 2013/0052979 A1* | 2/2013 | Chiang ................... G06F 21/31 455/404.1 |
| 2013/0185368 A1 | 7/2013 | Nordstrom et al. |
| 2013/0203393 A1 | 8/2013 | Bugalia et al. |
| 2013/0324071 A1 | 12/2013 | Huh |
| 2013/0326209 A1 | 12/2013 | Dommalapati et al. |
| 2013/0332721 A1 | 12/2013 | Chaudhri et al. |
| 2013/0346408 A1 | 12/2013 | Duarte et al. |
| 2014/0113581 A1 | 4/2014 | Nassimi |
| 2014/0135075 A1* | 5/2014 | Kobayashi ............ H04M 19/04 455/567 |
| 2014/0171146 A1* | 6/2014 | Ma ..................... H04M 1/72454 455/550.1 |
| 2014/0194159 A1 | 7/2014 | Karakaya et al. |
| 2014/0282174 A1* | 9/2014 | Dempski ............. G06F 3/04883 715/771 |

* cited by examiner

MOBILE PHONE HAVING EMERGENCY NOTIFICATION MODE

CROSS-REFERENCE TO RELATED APPLICATIONS

This is a continuation of co-pending application Ser. No. 15/877,389 filed Jan. 23, 2018, now U.S. Pat. No. 10,554,806, which issued Feb. 4, 2020 and is a continuation of application Ser. No. 15/361,711 filed Nov. 28, 2016, now U.S. Pat. No. 9,876,895, which issued Jan. 23, 2018 and is a continuation of application Ser. No. 15/048,282 filed Feb. 19, 2016, now U.S. Pat. No. 9,509,831, which issued Nov. 29, 2016 and is a continuation of application Ser. No. 14/589,984 filed Jan. 5, 2015, now U.S. Pat. No. 9,300,786, which issued Mar. 29, 2016 and is a continuation of application number of Ser. No. 13/892,877 filed May 13, 2013, now U.S. Pat. No. 8,929,875, which issued Jan. 6, 2015.

TECHNICAL FIELD OF THE INVENTION

The present invention relates, in general, to wireless communications devices and, in particular, to a wireless communications device having contact specific silent mode disabling capabilities.

BACKGROUND OF THE INVENTION

Wireless communications devices are used to access a variety of services and participate in various communications events. For example, these communications may include incoming and outgoing telephone calls, incoming and outgoing text messages, incoming and outgoing SMS messages, incoming and outgoing MMS messages, incoming and outgoing e-mails, WAP sessions and the like. More generally, these communications may include any form of communication between the user of a wireless communications device and at least one correspondent.

Commonly, wireless communications devices host a personal information manager (PIM) software application. The PIM software application is a computer program which allows a user to maintain and organize various types of personal information. PIM software applications often incorporate or communicate with a contacts database for storing and organizing contact information. The contacts database, which may be referred to as a contact manager or address book, typically contains one record or profile for each personal or business contact whose information is being maintained. Each profile may have such data fields as first name, last name, company name, department, address, city, state, country, zip code, email address and multiple telephone numbers such as home, work, mobile and facsimile. In addition, each profile may include other user selectable preferences such as ringtones for incoming telephone calls and text tones for incoming text, SMS or MMS messages.

It has been found, however, that the constant ringing, beeping and chirping of wireless communications devices at night can be disruptive to the sleep patterns of wireless communications device users. Accordingly, many wireless communications device users turn off their wireless communications device or shift their wireless communications device from an audible notification mode to a silent notification mode. It has been found, however, that certain important or emergency messages may not be obtained timely when a wireless communications device is in silent notification mode.

SUMMARY OF THE INVENTION

The present invention disclosed herein comprises a wireless communications device having contact specific silent mode disabling capabilities that enable a user to place the wireless communications device in silent mode without missing important or emergency messages from user selectable user contacts.

In one aspect, the present invention is directed to a wireless communications device. The wireless communications device includes a memory, an output device, an input device and a processor. The memory is adapted to maintain individual profiles relating to each of a plurality of user contacts. The profiles include a silent notification mode setting. The output device is operable to emit audible notifications responsive to incoming communications from the user contacts. The input device is operable to change a notification mode of the device between an audible notification mode and a silent notification mode. The processor is coupled to the memory, the output device and the input device. The processor is operable for processing user selections of the silent notification mode setting between a silent mode enabled setting and a silent mode disenabled setting for the profiles. The processor is configured to cause the output device to emit audible notifications responsive to incoming communications from the user contacts, when the device is in the audible notification mode. The processor is configured to prevent the output device from emitting audible notifications responsive to incoming communications from the user contacts having profiles with the silent mode enabled, when the device is in the silent notification mode. The processor is configured to cause the output device to emit audible notifications responsive to incoming communications from the user contacts having profiles with the silent mode disabled, when the device is in the silent notification mode.

In some embodiments, the silent notification mode setting may include a first silent notification mode setting for a first type of incoming communication and a second silent notification mode setting for a second type of incoming communication. In these embodiments, the first and second types of incoming communications may be incoming telephone calls, incoming text messages, incoming SMS messages, incoming MMS messages and incoming email messages. Also, in these embodiments, the processor may be configured to cause the output device to emit audible notifications responsive to incoming communications from the user contacts having profiles with the silent mode disabled for the type of incoming communication received, when the device is in the silent notification mode. In certain embodiments, the silent notification mode setting may be operated responsive to a soft switch. In one embodiment, the output device may be a speaker. In some embodiments, the input device may be a hard switch, a soft switch or a timer. In certain embodiments, the silent notification mode may include visual notifications, vibration notifications and no notifications.

In another aspect, the present invention is directed to a method of operating a wireless communications device. The method includes maintaining individual profiles relating to each of a plurality of user contacts, the profiles including a silent notification mode setting; processing user selections of the silent notification mode setting between a silent mode enabled setting and a silent mode disenabled setting for the profiles; emitting audible notifications responsive to incoming communications from the user contacts, when the device is in an audible notification mode; preventing audible notifications responsive to incoming communications from the user contacts having profiles with the silent mode enabled, when the device is in a silent notification mode; and emitting audible notifications responsive to incoming communications from the user contacts having profiles with the silent mode disabled, when the device is in the silent notification mode.

The method may also include processing a user selection of a first silent notification mode setting for a first type of incoming communication and processing a user selection of a second silent notification mode setting for a second type of incoming communication; emitting audible notifications responsive to incoming communications from the user contacts having profiles with the silent mode disabled for the type of incoming communication received, when the device is in the silent notification mode; shifting a soft switch to enable user selection of the silent notification mode setting; emitting audible notifications from a speaker; and/or operating the device between the silent notification mode and the audible notification mode with an input device selected from the group consisting of a hard switch, a soft switch and a timer.

In a further aspect, the present invention is directed to a non-transitory computer readable storage medium comprising a set of computer instructions executable by a processor for operating a wireless communications device. The computer instructions are configured to maintain individual profiles relating to each of a plurality of user contacts, the profiles including a silent notification mode setting; process user selections of the silent notification mode setting between a silent mode enabled setting and a silent mode disenabled setting for the profiles; cause an output device to emit audible notifications responsive to incoming communications from the user contacts, when the device is in an audible notification mode; prevent the output device from emitting audible notifications responsive to incoming communications from the user contacts having profiles with the silent mode enabled, when the device is in a silent notification mode; and cause the output device to emit audible notifications responsive to incoming communications from the user contacts having profiles with the silent mode disabled, when the device is in the silent notification mode.

Additional computer instructions may be configured to process a user selection of a first silent notification mode setting for a first type of incoming communication and process a user selection of a second silent notification mode setting for a second type of incoming communication; cause the output device to emit audible notifications responsive to incoming communications from the user contacts having profiles with the silent mode disabled for the type of incoming communication received, when the device is in the silent notification mode; and/or receive the user selection of the silent notification mode setting responsive to shifting a soft switch.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention and do not delimit the scope of the present invention.

Figure 1:
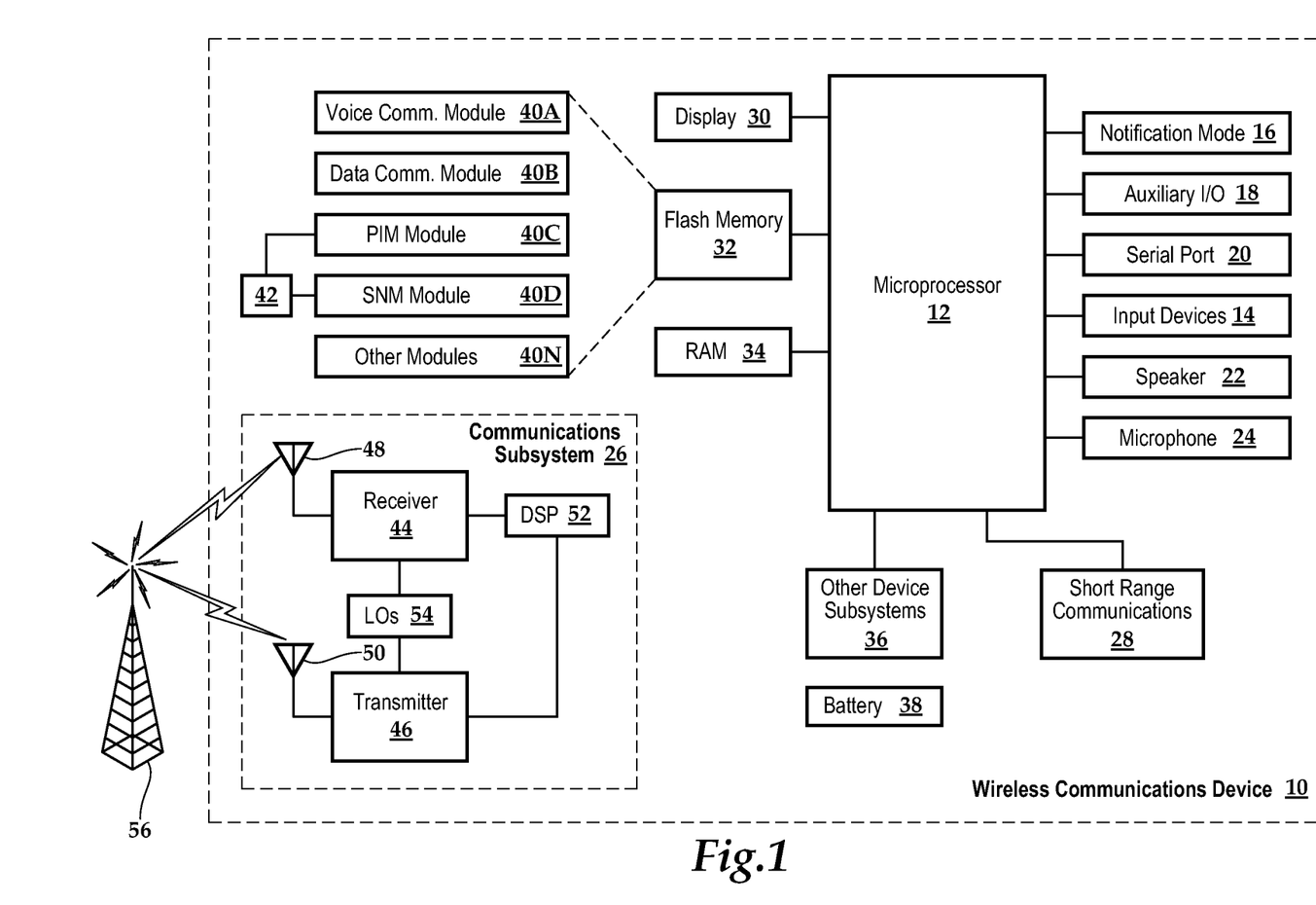
FIG. 1 is a schematic illustration of an exemplary wireless communications device in accordance with an embodiment of the present invention.

Referring initially to FIG. 1, therein is depicted a wireless communications device 10 such as a smartphone, a cell phone, a personal digital assistant, a tablet computer or other similar computing device. Wireless communications device 10 includes a microprocessor 12 that controls the overall operation of device 10 and may also be referred to simply as a "processor." Device 10 has a one or more input devices 14 such as an on/off switch, volume buttons, a home button, a touch screen, a keyboard and the like. In addition, device 10 includes a notification mode switch 16 in the form of a hard switch that is used to operate device 10 between an audible notification mode and a silent notification mode. In the illustrated embodiment, device 10 has other input/output devices including a set of auxiliary I/O devices 18, a serial port 20, a speaker 22 and a microphone 24. Wireless communications device 10 includes a communications subsystem 26, a short-range communications subsystem 28, a display 30, such as a touch screen display, memory devices including a flash memory 32 and a Random Access Memory (RAM) 34 as well as various other device subsystems 36. Device 10 includes a battery 38 to power the active elements of device 10.

Operating system software executed by the microprocessor 12 may be stored in a persistent store, such as flash memory 32 or alternatively may be stored in other types of memory devices, such as a read only memory (ROM) or similar storage element. In addition, system software, specific device applications, or parts thereof, may be temporarily loaded into a volatile store, such as RAM 34. Communication signals received by device 10 may also be stored to RAM 34.

Microprocessor 12, in addition to performing its operating system functions, executes software applications (computer programs) 40A-40N on device 10. A predetermined set of applications that control basic device operations, such as voice and data communications modules 40A and 40B, may be installed on device 10 during manufacture. Voice communication module 40A may incorporates a voice recognition engine. Also installed during or after manufacture is a personal information manager (PIM) application 40C for storing and organizing personal information. The PIM application 40C communicates with a contacts database 42 which may be incorporated into PIM application 40C. Contacts database 42 is not necessarily a conventional database although it could be a conventional database in some embodiments. Also installed during or after manufacture is a silent notification mode (SNM) module 40D that communicates with contacts database 42 to identify the silent notification mode setting in the profile of a user contact upon receipt of a communication messages from that user contact to determine whether speaker 22 should emit an audible notification responsive to the incoming communication when device 10 is in the silent notification mode. Additional software modules, illustrated as software modules 40N, may also be installed during or after manufacture.

Wireless communication device 10 may be a two-way RF communication device having voice and data communication capabilities. Communication functions, including data and voice communications, are performed by device 10 through communication subsystem 26 and possibly through short-range communications subsystem 28. Communication subsystem 26 includes a receiver 44, a transmitter 46 and one or more antennas 48, 50. In addition, communication subsystem 26 includes a processing module, such as a digital signal processor (DSP) 52 and local oscillators (LOs) 54. The specific design and implementation of communication subsystem 26 is dependent upon the communication network in which device 10 is intended to operate. For example, communication subsystem 26 of device 10 may be designed to operate with the General Packet Radio Service (GPRS) mobile data communication networks and may also be designed to operate with any of a variety of voice communication networks, such as Advanced Mobile Phone Service (AMPS), Time Division Multiple Access (TDMA), Code Division Multiple Access (CDMA), Personal Communication Services (PCS), Global System for Mobile communication (GSM), third generation (3G) wireless, Universal Mobile Telecommunications Standard (UMTS) and/or fourth generation (4G) wireless. Other types of data and voice networks, both separate and integrated, may also be utilized with device 10.

When any required network registration or activation procedures have been completed, wireless communications device 10 may send and receive communication signals over communication network 56. Signals received from communication network 56 by antenna 48 are routed to receiver 44, which provides for signal amplification, frequency down conversion, filtering, channel selection, etc., and may also provide analog-to-digital conversion. Analog-to-digital conversion of the received signal allows DSP 52 to perform more complex communication functions, such as demodulation and decoding. In a similar manner, signals to be transmitted to network 56 are processed (e.g. modulated and encoded) by DSP 52 and are then provided to transmitter 46 for digital-to-analog conversion, frequency up conversion, filtering, amplification and transmission to communication network 56 via antenna 50.

In a data communication mode, a received signal, such as a text message or web page download, is processed by communication subsystem 26 and is input to microprocessor 12. The received signal is then further processed by microprocessor 12 for an output to display 30 or alternatively to some other auxiliary I/O devices 18. A device user may also compose data items, such as email messages, using one of the input devices 14, such as a soft or hard keyboard and/or some other auxiliary I/O device 18. The composed data items may then be transmitted over communication network 56 via communication subsystem 26.

In a voice communication mode, overall operation of the device is substantially similar to the data communication mode, except that received signals are output to speaker 22 and signals for transmission are generated by microphone 24. Alternative voice or audio I/O subsystems, such as a voice message recording subsystem, may also be implemented on device 10. In addition, display 30 may be utilized in voice communication mode, for example, to display the identity of a calling party, the duration of a voice call or other voice call related information.

Short-range communications subsystem 28 enables communication between device 10 and other proximate systems or devices, which need not necessarily be similar devices. For example, short-range communications subsystem 28 may include an infrared device and associated circuits and components or a Bluetooth communication module to provide for communication with similarly-enabled systems and devices.

Figure 2A:
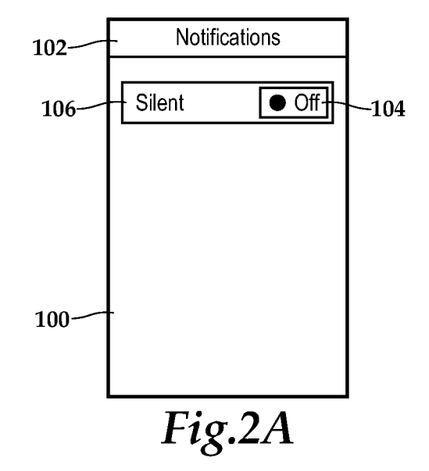
FIGS. 2A-2C are schematic diagrams of an exemplary touch screen display of a wireless communications device in accordance with an embodiment of the present invention depicting various Notifications screens.
Figure 2B:
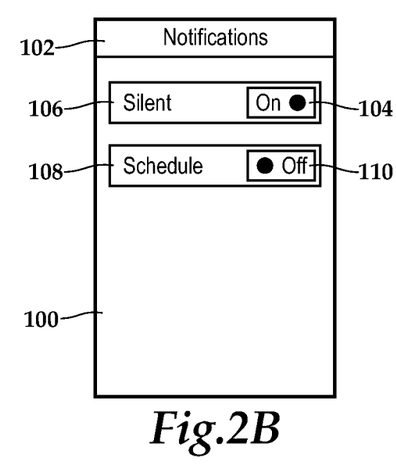
Figure 2C:
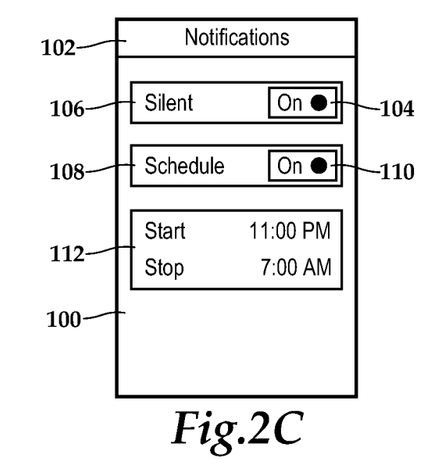

Referring next to FIGS. 2A-2C, therein are depicted schematic diagrams of an exemplary touch screen display of a wireless communications device in accordance with an embodiment of the present invention that is generally designated 100. In the illustrated embodiment, display 100 is displaying a Notifications screen 102. The Notifications screen 102 allows the user to change the notification mode of device 10 between an audible notification mode and a silent notification mode. As discussed above, wireless communications devices 10 are generally capable of engaging in a variety of communications such as incoming and outgoing telephone calls, incoming and outgoing text messages, incoming and outgoing SMS messages, incoming and outgoing MMS messages, incoming and outgoing e-mails, WAP sessions and the like. When one of these communications is received by device 10, processor 12 process information associated with the communication such as the sender of the communication and the type of communication being sent. In addition, processor 12 causes speaker 22 to emit audible notifications responsive to incoming communication, when device 10 is in the audible notification mode. However, as discussed above, there are times when the user of device 10 would prefer not to be interrupted by the constant ringing, beeping and chirping of device 10, for example, at night when such interruptions can be disruptive to healthy sleep patterns.

To alleviate these interruptions, the user of device 10 can operate notification mode hard switch 16 discussed above from the audible position to the silent position through physical interaction with hard switch 16. Alternatively, the user of device 10 can operate a soft switch 104 located within Silent control pane 106 from the off position, depicted in FIG. 2A, to the on position through touch screen interaction. In certain embodiments, once soft switch 104 is operated from the off position to the on position, processor 12 prevents speaker 22 from emitting audible notifications responsive to incoming communications unless, as discussed below, the incoming communication is from a user contact having a profile with the silent mode disabled. Alternatively, as depicted in FIG. 2B, when soft switch 104 is operated from the off position to the on position, a Schedule control pane 108 is instantiated. The user of device 10 may then operate soft switch 110, through touch screen interaction, from the off position to the on position, which instantiates a time range control pane 112, as best seen in FIG. 2C. The user is then able to set, for example, a daily start time and a daily stop time for device 10 to automatically enter and exit silent notification mode. Regardless of whether device 10 enters silent notification mode responsive to operation of Notification switch 16, responsive to operation of soft switch 104 or responsive to a timer set in association with time range control pane 112, once in silent notification mode, processor 12 prevents speaker 22 from emitting audible notifications responsive to incoming communications unless, as discussed below, the incoming communication is from a user contact having a profile with the silent mode disabled.

As discussed above, there are communications from certain people that the user of wireless communications device 10 may not want to miss even at night, for example, phone calls from a family member or emails from one's boss. For these instances, the wireless communications device of the present invention allows the user to select certain contacts from the contacts database and, if desired, certain types of communications from the selected contacts that will trigger audible notification even if device 10 is in silent notification mode. This selective disabling of the silent notification mode of device 10 is achieved on a contact by contact basis by making changes to the silent notification mode setting in individual user contact profiles.

Figure 3A:
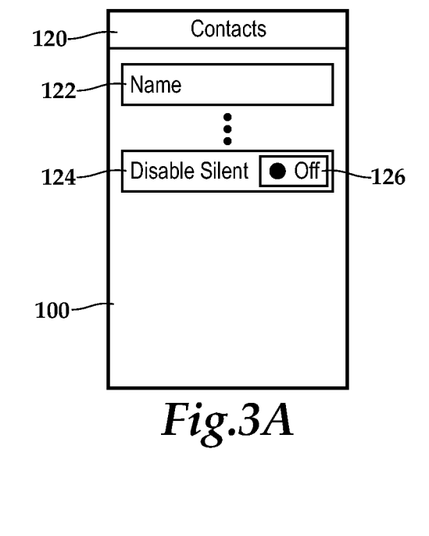
FIGS. 3A-3C are schematic diagrams of an exemplary touch screen display of a wireless communications device in accordance with an embodiment of the present invention depicting various Contacts screens.
Figure 3B:
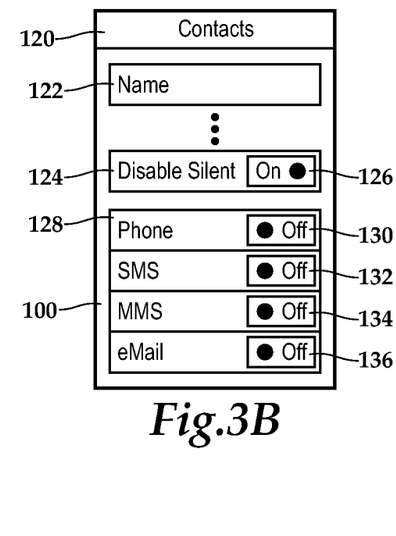
Figure 3C:
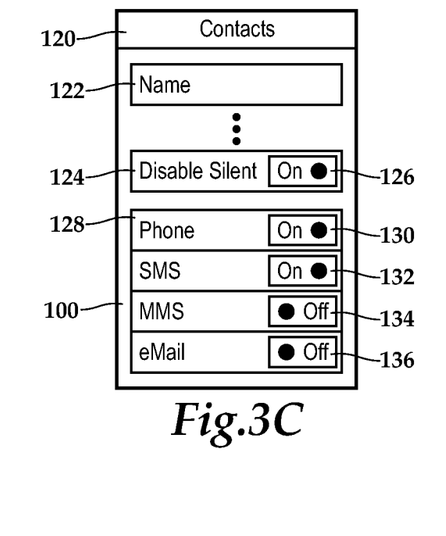

Referring next to FIGS. 3A-3C, therein are depicted schematic diagrams of an exemplary touch screen display of a wireless communications device in accordance with an embodiment of the present invention that is generally designated 100. In the illustrated embodiment, display 100 is displaying Contacts screen 120. Contacts screen 120 allows the user to change the silent notification mode setting of a particular contact between a silent mode enabled setting and a silent mode disenabled setting that becomes part of the profile of that contact. As discussed above, each profile may include information such as first name, last name, company name, department, address, city, state, country, zip code, email address and multiple telephone numbers such as home, work, mobile and facsimile, which the user may edit in the associated control pane. For simplicity, the illustrated example only depicts the Name control pane 122. In addition, the illustrated example depicts the Disable Silent control pane 124 that includes soft switch 126. The user of device 10 may then operate soft switch 126, through touch screen interaction, from the off position to the on position. In certain embodiments, once soft switch 126 is operated from the off position to the on position, processor 12 will cause speaker 22 to emit an audible notification responsive to an incoming communication from that user contact, even when device 10 is in the silent notification mode.

Alternatively, as depicted in FIG. 3B, when soft switch 126 is operated from the off position to the on position, a message type control pane 128 is instantiated. In the illustrated embodiment, message type control pane 128 include a phone control pane having a soft switch 130, an SMS control pane having a soft switch 132, an MMS control pane having soft switch 134 and an email control pane having soft switch 136. The user of device 10 may now operate any one or more of soft switches 130, 132, 134, 136 as desired such as operating soft switch 130 and soft switch 132, through touch screen interaction, from the off position to the on position, as best seen in FIG. 3C. Now, if the user of device 10 receives a phone call or an SMS message from the user contact associated with the illustrated embodiment when device 10 is in silent notification mode, processor 12 will cause speaker 22 to emit an audible notification responsive to that incoming communication. On the other hand, if the user of device 10 receives an MMS message or an email message from the user contact associated with the illustrated embodiment when device 10 is in silent notification mode, processor 12 will prevent speaker 22 from emitting an audible notification responsive to that incoming communication.

Figure 4:
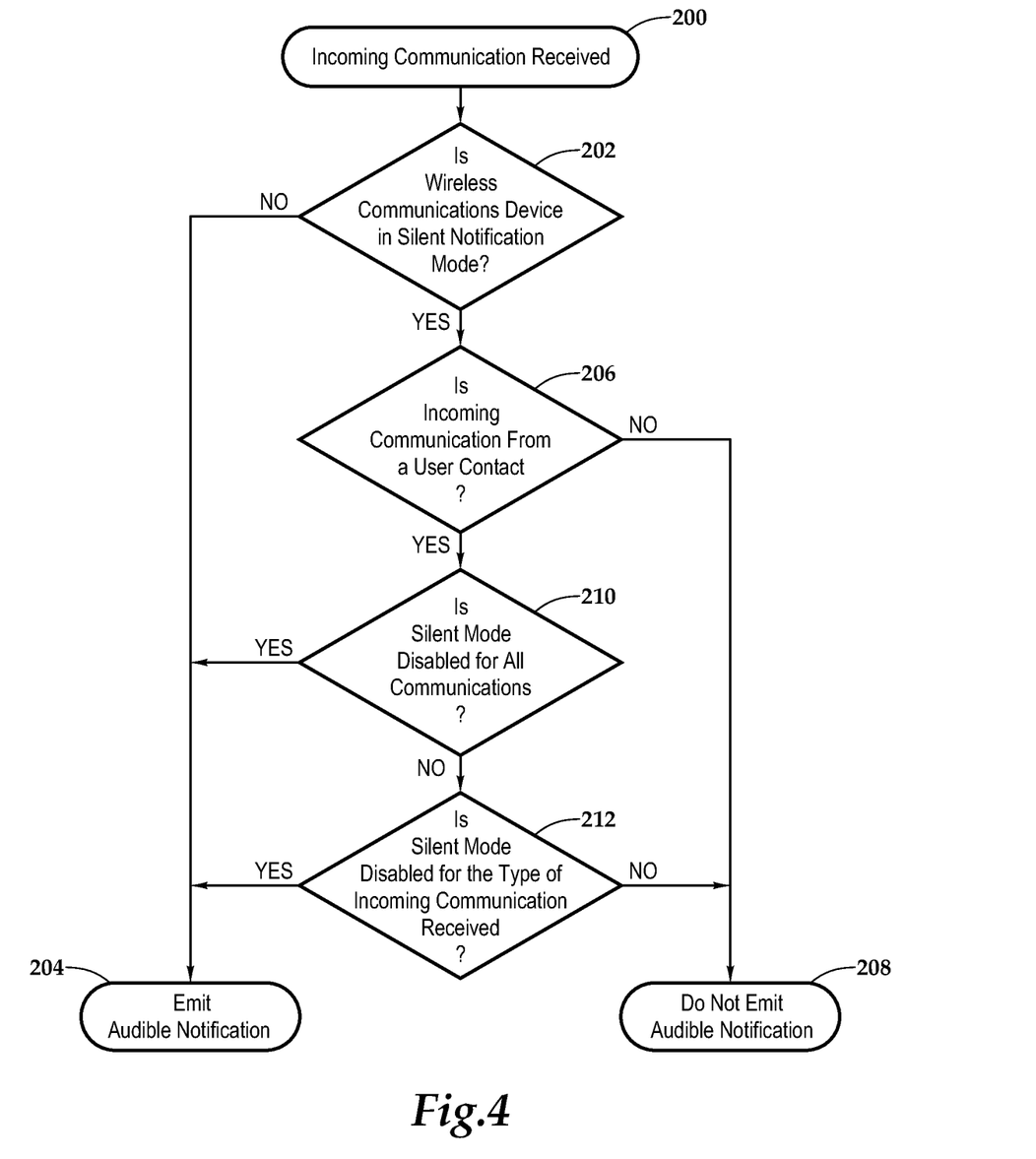
FIG. 4 is a flow diagram illustrating a method of operating a wireless communications device in accordance with an embodiment of the present invention.

Referring now to FIG. 4, a flow diagram illustrating a method of operating a wireless communications device in accordance with an embodiment of the present invention is presented. In block 200, the method involves receiving an incoming communication at device 10. In decision 202, it is determined whether device 10 is in silent notification mode. If device 10 is not in silent notification mode, the process progresses to block 204 and speaker 22 of device 10 emits an audible notification of the incoming communication. If device 10 is in silent notification mode, the process progresses to decision 206, in which it is determined whether the incoming communication is from a user contact in contact database 42. If the incoming communication is not from a user contact in contact database 42, the process progresses to block 208 and speaker 22 of device 10 does not emit an audible notification of the incoming communication. If the incoming communication is from a user contact in contact database 42, the process progresses to decision 210, in which it is determined whether the profile of the user contact of the incoming communication has disabled silent mode for all communications from that user contact. If silent mode has been disabled for all communications from that user contact, the process progresses to block 204 and speaker 22 of device 10 emits an audible notification of the incoming communication. If silent mode has not been disabled for all communications from that user contact, the process progresses to decision 212, in which it is determined whether the profile of the user contact of the incoming communication has disabled silent mode for the type of communication that has been received. If silent mode has been disabled for the type of communication received, the process progresses to block 204 and speaker 22 of device 10 emits an audible notification of the incoming communication. If silent mode has not been disabled for the type of communication received, the process progresses to block 208 and speaker 22 of device 10 does not emit an audible notification of the incoming communication.

While this invention has been described with reference to illustrative embodiments, this description is not intended to be construed in a limiting sense. Various modifications and combinations of the illustrative embodiments as well as other embodiments of the invention will be apparent to persons skilled in the art upon reference to the description. It is, therefore, intended that the appended claims encompass any such modifications or embodiments.

What is claimed is:

1. A mobile phone configured to operate in a normal notification mode and an emergency notification mode, in the normal notification mode, sounds associated with incoming calls from both non-emergency contacts and emergency contacts are generated and, in the emergency notification mode, sounds associated with incoming calls from the non-emergency contacts are suppressed, but sounds associated with incoming calls from the emergency contacts are generated, the mobile phone comprising:
   a memory configured to store contact information for a plurality of contacts including the non-emergency contacts and the emergency contacts, the contact information including an emergency notification setting for incoming calls;
   at least one speaker configured to generate sounds;
   a touch screen configured to receive a user selection of the emergency notification setting for incoming calls on a contact by contact basis; and
   at least one processor coupled to the memory, the speaker and the touch screen;

wherein, the non-emergency contacts are the contacts that do not have the emergency notification setting for incoming calls selected by the user;

wherein, the emergency contacts are the contacts having the emergency notification setting for incoming calls selected by the user;

wherein, in the normal notification mode, incoming calls from both the non-emergency contacts and the emergency contacts cause the speaker to generate sounds; and wherein, in the emergency notification mode, incoming calls from the non-emergency contacts do not cause the speaker to generate sounds, but incoming calls from the emergency contacts causes the speaker to generate sounds.

2. The phone as recited in claim 1 further comprising a soft switch configured to receive the user selection of the emergency notification setting for incoming calls for each contact.

3. The phone as recited in claim 1 further comprising a soft switch configured to receive a user selection of the normal notification mode and the emergency notification mode.

4. The phone as recited in claim 1 further comprising a hard switch configured to receive a user selection of the normal notification mode and the emergency notification mode.

5. The phone as recited in claim 1 wherein the contacts having the emergency notification setting for incoming calls selected further comprise contacts having a silent mode setting bypassed for incoming calls.

6. A mobile phone configured to operate in a normal notification mode and an emergency notification mode, in the normal notification mode, sounds associated with incoming text messages from both non-emergency contacts and emergency contacts are generated and, in the emergency notification mode, sounds associated with incoming text messages from the non-emergency contacts are suppressed, but sounds associated with incoming text messages from the emergency contacts are generated, the mobile phone comprising a memory configured to store contact information for a plurality of contacts including the non-emergency contacts and the emergency contacts, the contact information including an emergency notification setting for incoming text messages;

at least one speaker configured to generate sounds;

a touch screen configured to receive a user selection of the emergency notification setting for incoming text messages on a contact by contact basis; and at least one processor coupled to the memory, the speaker and the touch screen;

wherein, the non-emergency contacts are the contacts that do not have the emergency notification setting for incoming text messages selected by the user;

wherein, the emergency contacts are the contacts having the emergency notification setting for incoming text messages selected by the user;

wherein, in the normal notification mode, incoming text messages from both the non-emergency contacts and the emergency contacts cause the speaker to generate sounds; and wherein, in the emergency notification mode, incoming text messages from the non-emergency contacts do not cause the speaker to generate sounds, but incoming text messages from the emergency contacts causes the speaker to generate sounds.

7. The phone as recited in claim 6 further comprising a soft switch configured to receive the user selection of the emergency notification setting for incoming text messages for each contact.

8. The phone as recited in claim 6 further comprising a soft switch configured to receive a user selection of the normal notification mode and the emergency notification mode.

9. The phone as recited in claim 6 further comprising a hard switch configured to receive a user selection of the normal notification mode and the emergency notification mode.

10. The phone as recited in claim 6 wherein the incoming text messages further comprise incoming SMS messages and incoming MMS messages.

11. The phone as recited in claim 6 wherein the contacts having the emergency notification setting for incoming text messages selected further comprise contacts having a silent mode setting bypassed for incoming text messages.

12. A mobile phone configured to operate in a normal notification mode and an emergency notification mode, in the normal notification mode, sounds associated with incoming communications from both non-emergency contacts and emergency contacts are generated and, in the emergency notification mode, sounds associated with incoming communications from the non-emergency contacts are suppressed, but sounds associated with incoming communications from the emergency contacts are generated, the mobile phone comprising:

a memory configured to store contact information for a plurality of contacts including the non-emergency contacts and the emergency contacts, the contact information including an emergency notification setting for incoming communications;

at least one speaker configured to generate sounds;

a touch screen configured to receive a user selection of the emergency notification setting for incoming communications on a contact by contact basis; and at least one processor coupled to the memory, the speaker and the touch screen;

wherein, the non-emergency contacts are the contacts that do not have the emergency notification setting for incoming communications selected by the user;

wherein, the emergency contacts are the contacts having the emergency notification setting for incoming communications selected by the user;

wherein, in the normal notification mode, incoming communications from both the non-emergency contacts and the emergency contacts cause the speaker to generate sounds; and wherein, in the emergency notification mode, incoming communications from the non-emergency contacts do not cause the speaker to generate sounds, but incoming communications from the emergency contacts causes the speaker to generate sounds.

13. The phone as recited in claim 12 wherein the incoming communications are selected from the group consisting of incoming voice communications and incoming data communications.

14. The phone as recited in claim 13 wherein the touch screen is configured to separately receive the user selection of an emergency notification setting for incoming voice communications and an emergency notification setting for incoming data communications for each contact.

15. The phone as recited in claim 13 wherein the incoming data communications further comprise incoming text messages, incoming SMS messages and incoming MMS messages.

16. The phone as recited in claim 12 wherein the contacts having the emergency notification setting for incoming communications selected further comprise contacts having a silent mode setting bypassed for incoming calls.

17. The phone as recited in claim 12 wherein the contacts having the emergency notification setting for incoming communications selected further comprise contacts having a silent mode setting bypassed for incoming text messages.

18. The phone as recited in claim 12 further comprising at least one soft switch configured to receive the user selection of the emergency notification setting for incoming communications for each contact.

19. The phone as recited in claim 12 further comprising a soft switch configured to receive the user selection of the emergency notification setting for incoming text messages for each contact.

20. The phone as recited in claim 12 further comprising a soft switch configured to receive a user selection of the normal notification mode and the emergency notification mode.

* * * * *